US011038232B2

(12) United States Patent
Rangwala

(10) Patent No.: US 11,038,232 B2
(45) Date of Patent: Jun. 15, 2021

(54) ALL FRONT ACCESS BATTERY RACK SYSTEM WITH INSULATED BUS BAR CONNECTION

(71) Applicant: Toshiba International Corporation, Houston, TX (US)

(72) Inventor: Zaheer Rangwala, Katy, TX (US)

(73) Assignee: Toshiba International Corporation, Houston, TX (US)

(*) Notice: Subject to any disclaimer, the term of this patent is extended or adjusted under 35 U.S.C. 154(b) by 221 days.

(21) Appl. No.: 15/973,760

(22) Filed: May 8, 2018

(65) Prior Publication Data

US 2019/0348646 A1 Nov. 14, 2019

(51) Int. Cl.
*H01M 2/10* (2006.01)
*H02G 5/02* (2006.01)
*H01M 2/20* (2006.01)
*H01M 50/20* (2021.01)
*H01M 50/502* (2021.01)

(52) U.S. Cl.
CPC ......... *H01M 50/20* (2021.01); *H01M 50/502* (2021.01); *H02G 5/025* (2013.01)

(58) Field of Classification Search
None
See application file for complete search history.

(56) References Cited

U.S. PATENT DOCUMENTS

| 2014/0017528 A1* | 1/2014 | Uehara | H01M 10/4207 429/61 |
| 2016/0028056 A1* | 1/2016 | Lee | B60L 58/21 429/121 |
| 2018/0069336 A1* | 3/2018 | Krebs | H01R 13/187 |
| 2019/0140229 A1* | 5/2019 | Lindstrom | H01M 10/613 |
| 2019/0305282 A1* | 10/2019 | Jeon | H01M 2/1077 |
| 2019/0334142 A1* | 10/2019 | Kwon | H01M 10/425 |

FOREIGN PATENT DOCUMENTS

WO WO2018016815 * 1/2018

* cited by examiner

*Primary Examiner* — Christopher P Domone
(74) *Attorney, Agent, or Firm* — Baker Botts L.L.P.

(57) ABSTRACT

In accordance with presently disclosed embodiments, an all front access battery rack system using insulated bus bars is provided. In one embodiment, a battery rack system may comprise: a controller rack module aligned on a rack; a battery rack module aligned on the rack; first and second insulated bus bars aligned perpendicularly to and electrically coupling the controller rack module with positive and negative terminals of the battery rack module along a front side of the rack, wherein each insulated bus bar comprises: a conductive material comprising conductive connector ends operable to electrically engage with the controller rack module and the battery rack module; and an insulative material electrically insulating the conductive material between the conductive connectors.

18 Claims, 3 Drawing Sheets

ALL FRONT ACCESS BATTERY RACK SYSTEM WITH INSULATED BUS BAR CONNECTION

TECHNICAL FIELD

Embodiments of the present disclosure relate to battery rack systems and, more particularly, to an all front access battery rack system which uses insulated bus bar connections to power and control battery rack modules.

BACKGROUND

Battery rack systems are commonly used to supply and control power to loads using multiple battery rack modules. Currently, these battery rack systems often utilize cable connections for interconnecting battery rack modules. For example, current systems require an exposed bus bar terminal associated with each battery rack module to which jumper cables or other types of cables are attached. Safety features, such as insulation covers over each exposed bus bar terminal, are required in these systems. Additionally, current designs often provide for connection terminals that are located on the side or rear of the battery rack modules, so as to prevent safety hazards associated with the exposed bus bar terminals. Side or rear access terminals can be difficult to access and otherwise less efficient than front access systems. Thus, a safer and easier method of connecting battery rack modules is desired.

SUMMARY

In accordance with the above, presently disclosed embodiments are directed to an all front access battery system using insulated bus bar connections to power and control battery rack modules.

In some embodiments, a battery rack system may comprise: a controller rack module aligned on a rack; a battery rack module aligned on the rack; first and second insulated bus bars aligned perpendicularly to and electrically coupling the controller rack module with positive and negative terminals of the battery rack module along a front side of the rack, wherein each insulated bus bar comprises: a conductive material comprising conductive connector ends operable to electrically engage with the controller rack module and the battery rack module; and an insulative material electrically insulating the conductive material between the conductive connectors.

In some embodiments, a method of powering a battery rack system may comprise aligning a controller rack module on a rack; aligning at least one battery rack module in parallel to the controller rack module on a rack, the at least one battery rack module comprising a positive terminal and a negative terminal facing a front side of the rack; aligning at least one insulated bus bar perpendicularly to the at least one battery rack module and controller rack module; electrically coupling a first set of insulated bus bars to the positive terminals of the at least one battery rack module and the controller rack module; and electrically coupling a second set of insulated bus bars to the negative terminals of the at least one battery rack module and the controller rack module.

In certain embodiments, a front access battery rack system may comprise a controller rack module aligned horizontally on a rack; a plurality of battery rack modules aligned horizontally and parallel to the controller rack module and to one another on the rack, each battery rack module comprising a positive terminal and a negative terminal; a plurality of insulated bus bars aligned vertically and perpendicularly to the plurality of battery rack modules, wherein the plurality of insulated bus bars comprise a first set of insulated bus bars and a second set of insulated bus bars, such that the first set of insulated bus bars electrically couple the positive terminals of the plurality of battery rack modules and the controller rack module; and the second set of insulated bus bars electrically couple the negative terminals of the plurality of battery rack modules and the controller rack module.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit or define the scope of the disclosure.

Figure 1:
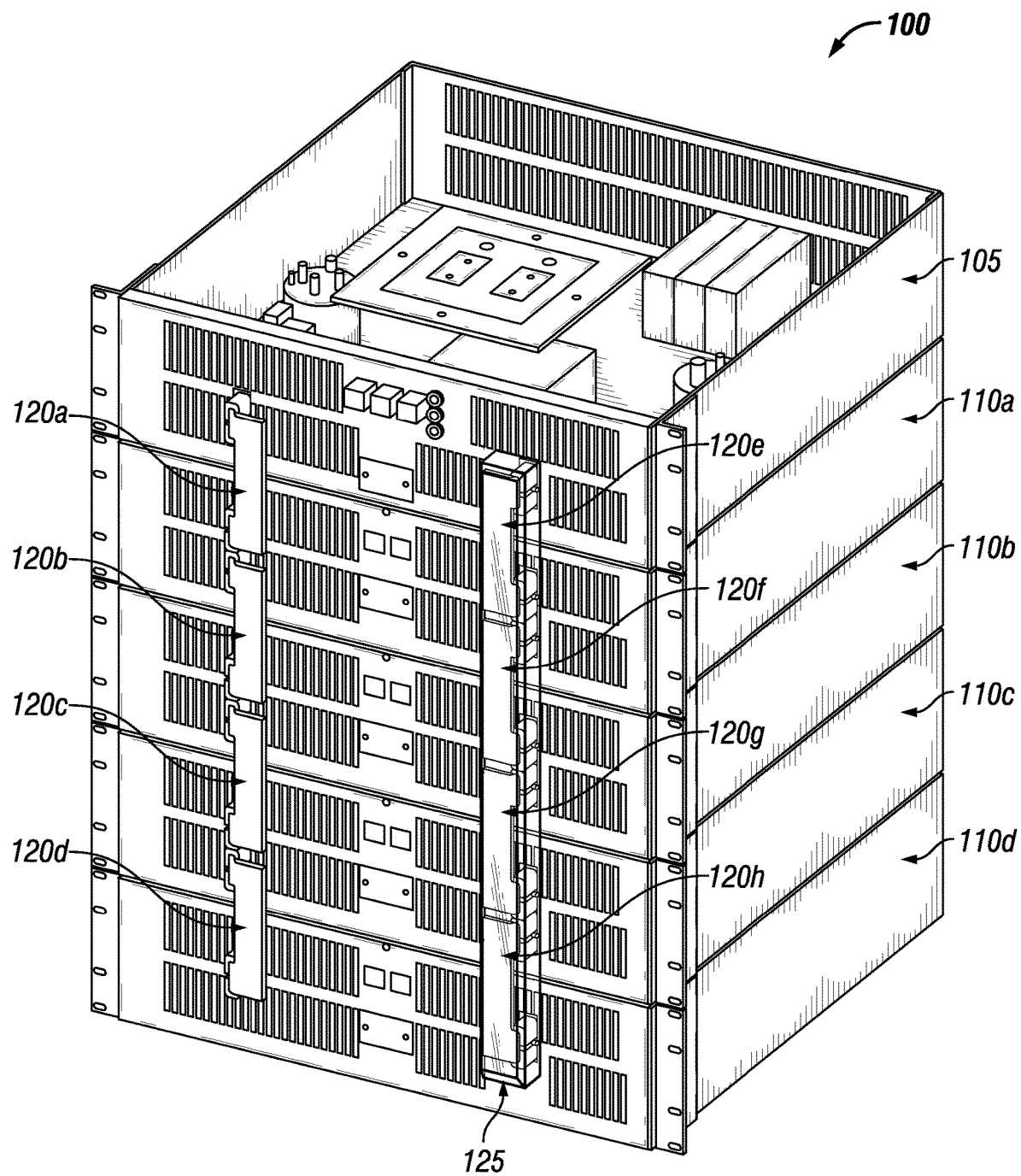
FIG. 1 is a front view of a battery rack system with a plurality of insulated bus bars, in accordance with an embodiment of the present disclosure.

Turning now to the drawings, FIG. 1 illustrates an embodiment of a battery rack system 100 comprising a controller rack module 105, a plurality of battery rack modules 110, and a plurality of insulated bus bars 120. The plurality of battery rack modules 110 may comprise one or more battery rack modules 110a, 110b, 110c, and 110d and may be aligned parallel to one another, for example, horizontally. Further, the plurality of battery rack modules 110 may be stacked on top of one another as illustrated in FIG. 1. Insulated bus bars 120 may be positioned or disposed on the front face of battery rack system 100. In other embodiments, battery rack modules 110 and controller rack module 105 may be aligned, mounted, or stacked vertically. In other embodiments, battery rack modules 110 may be positioned or disposed such that the insulated bus bars 120 are facing up or aligned parallel to the ground.

The plurality of insulated bus bars 120 may comprise, for example, insulated bus bars 120a, 120b, 120c, 120d, 120e, 120f, 120g, and 120h as shown in FIG. 1. One or more insulated bus bars 120 may be aligned perpendicularly to the one or more battery rack modules 110, for example, vertically. The one or more insulated bus bars 120 may electrically couple one or more battery rack modules 110 to one another, or one or more battery rack modules 110 to one or more controller rack modules 105. For example, insulated bus bar 120a may electrically couple controller rack module 105 to battery rack module 110a, and insulated bus bar 120b may electrically couple battery rack modules 110a and 110b. Any one or more insulated bus bars 120 may electrically couple one or more battery rack modules 110 or controller rack modules 105 to one another.

In some embodiments, an extra insulation element, for example, insulation cover 125, may be installed over one or more insulated bus bars 120 for additional safety. Insulation cover 125 may be installed or mounted over one or more insulated bus bars 120 after an insulated bus bar 120 is in place in the battery rack system 100 and electrically coupled to one or more battery rack modules 110 or controller rack module 105. In some embodiments, insulated cover 125 may be mounted or coupled to the battery rack system 100 such that a tool is required to remove the insulated cover 125. In some embodiments, insulated cover 125 may comprise individual covers which separately cover each insulated bus bar 120. In some embodiments, insulated cover 125 may comprise a single cover that covers all of the insulated bus bars 120 along the length of the front of rack system 100. In some embodiments, insulated cover 125 may be hinged such that insulated cover 125 can be opened in swinging fashion, like a door, so that the covered insulated bus bars 120 are user accessible when it is hinged open. In some embodiments, insulated cover 125 may cover or enclose at least a portion of one or more insulated bus bars 120. In some embodiments, insulated cover 125 may cover or enclose all of the insulated bus bars 120 in a battery rack system 100. In some embodiments, insulated cover 125 may be comprised of polycarbonate or any other UL 94 V-0 rated insulation material, as would be understood by one of ordinary skill in the art.

Figure 2:
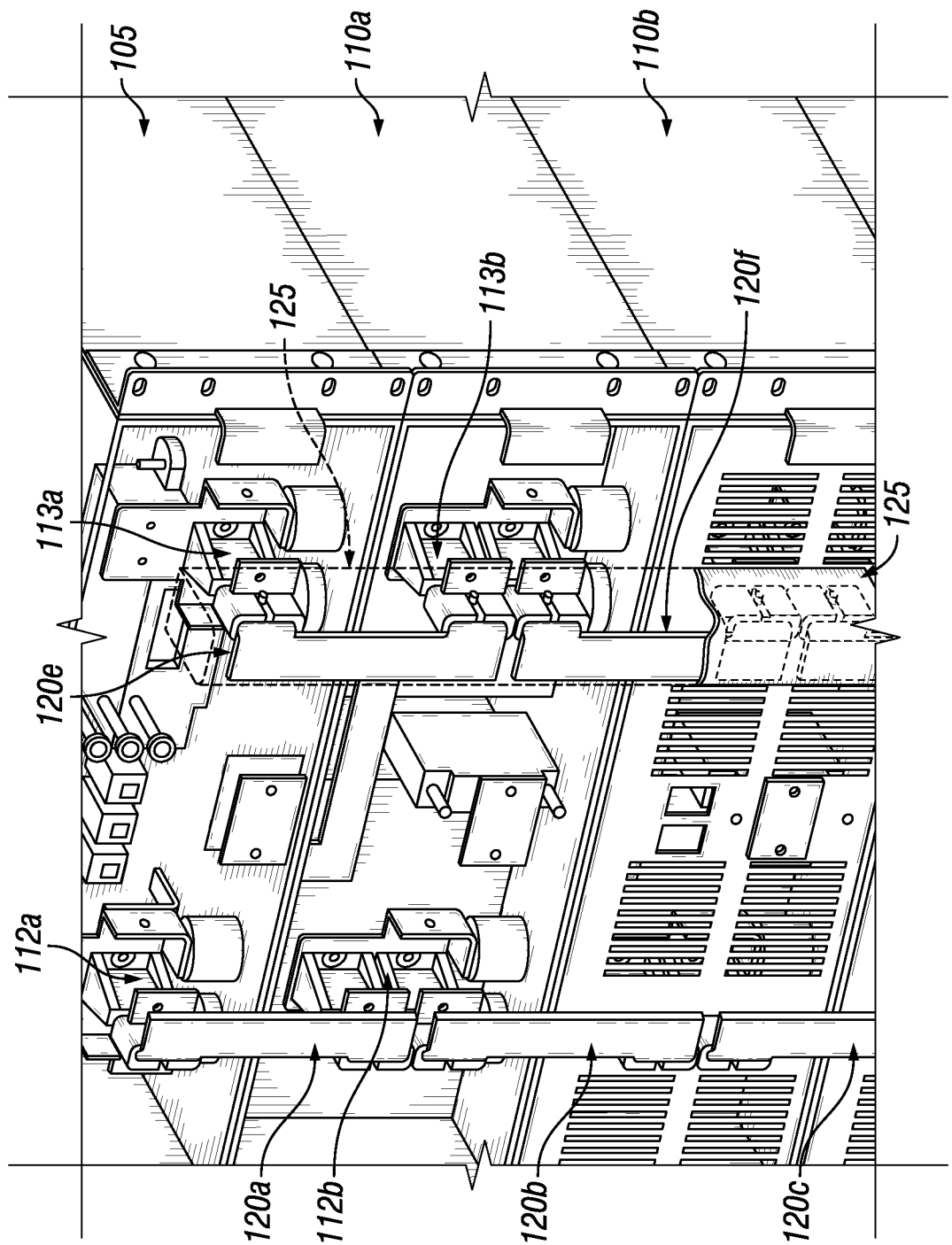
FIG. 2 is an enlarged view of an open battery rack system with a plurality of insulated bus bars, in accordance with an embodiment of the present disclosure.

FIG. 2 illustrates an enlarged, open view of a portion of battery rack system 100. In some embodiments, each battery rack module 110 and controller rack module 105 may comprise a positive terminal 112 and a negative terminal 113. For example, controller rack module 105 may comprise positive terminal 112a and negative terminal 113a, and battery rack module 110a may comprise positive terminal 112b and negative terminal 113b. In some embodiments, battery rack module 110 and controller rack module 105 may comprise multiple batteries each comprising a positive terminal and a negative terminal. For example, battery rack module 110 may comprise two or more internal batteries connected in series. In some embodiments, the terminals of internal batteries not connected in series to other internal batteries may comprise the positive terminal 112 and negative terminal 113 of battery rack module 110.

One or more insulated bus bars 120 may be positioned or disposed to electrically couple one or more battery rack modules 110 to one another and one or more battery rack modules 110 to controller rack module 105. For example, a first insulated bus bar 120a may couple the positive terminal 112a of controller rack module 105 to the positive terminal 112b of battery rack module 110a. A second insulated bus bar 120e may couple the negative terminal 113a of controller rack module 105 to the negative terminal 113b of battery rack module 110a. In a similar manner, as shown in FIG. 1, battery rack module 110a may be coupled to battery rack module 110b via insulated bus bars 120b and 120f, battery rack module 110b may be coupled to battery rack module 110c via insulated bus bars 120c and 120g, and battery rack module 110c may be coupled to battery rack module 110d via insulated bus bars 120d and 120h. In such an embodiment, the one or more battery rack modules 110, for example battery rack modules 110a, 110b, 110c, and 110d, may be electrically connected in parallel. In other embodiments, the one or more battery rack modules 110 may be electrically connected in series. As would be understood by one of ordinary skill in the art, the number of battery rack modules 110 depicted in FIG. 1 should not be construed as limiting. Any number of battery rack modules 110 and insulated bus bars 120 may be added, subtracted, or used in accordance with the present disclosure. For example, in some embodiments, only one battery rack module 110 may be used in a battery rack system 100. In other embodiments, for example, two, five, eight, or ten battery rack modules 100 may be used in a battery rack system 100.

Figure 3:
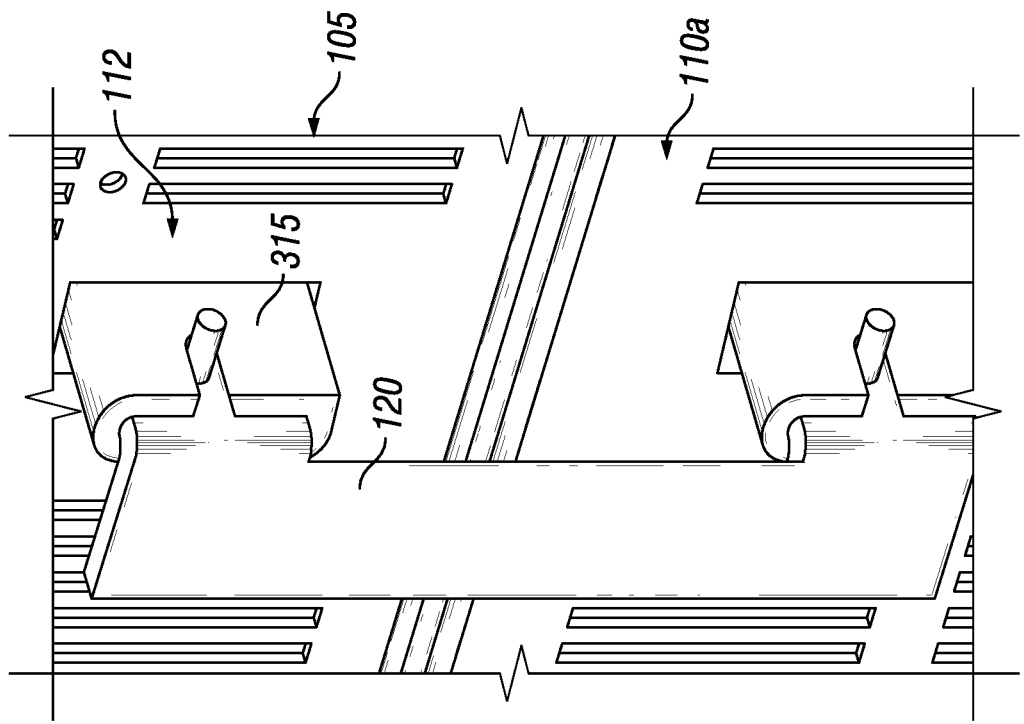
FIG. 3 is a perspective view of an insulated bus bar coupled to one or more battery rack modules, in accordance with an embodiment of the present disclosure.

FIG. 3 is an enlarged view of an insulated bus bar 120 that is electrically coupled to a controller rack module 105 and a first battery rack module 110a. Controller rack module 105 and first battery rack module 110a may each comprise an insulated guide bracket 315 for coupling, attaching, or otherwise connecting the insulated bus bar 120. Insulated guide bracket 315 may allow insulated bus bar 120 to snap in or otherwise attach to the controller rack module 105 and one or more battery rack modules 110 such that the insulated bus bar 120 is secured in place. Insulated bus bar 120 may be positioned such that the conductive portion of insulated bus bar 120 is completely enclosed within insulated guide bracket 315. Insulated guide bracket 315 may be made of any insulative material to ensure that no conductive material operable to conduct electrical current is exposed or otherwise accessible once the insulated bus bar 120 is coupled to controller rack module 105, one or more battery rack modules 110, or both. As would be understood by one of ordinary skill in the art, insulated guide bracket 315 may be any suitable component that secures insulated bus bar 120 in place.

Figure 4:
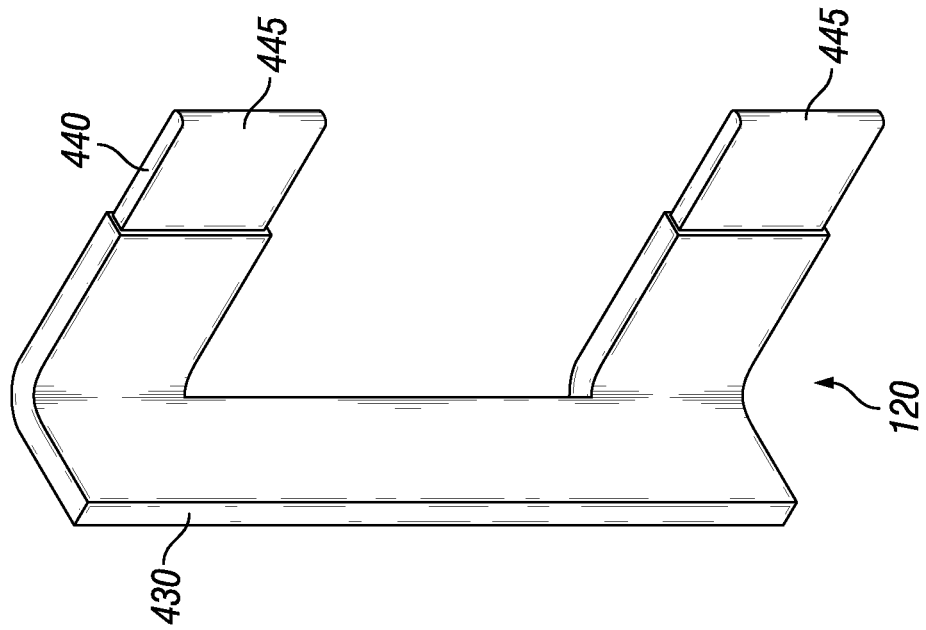
FIG. 4 is a perspective view of an insulated bus bar in isolation, in accordance with an embodiment of the present disclosure.

FIG. 4 is a side view of an insulated bus bar 120 in isolation. Insulated bus bar 120 may comprise an insulative material 430 covering all but two exposed connector ends 445 of a rigid or flexible conductive material 440. Insulative material 430 may substantially enclose the bus bar 120 such that only the connector ends 445 of conductive material 440 are exposed, as shown in FIG. 4. Connector ends 445 can electrically engage with battery rack modules 120 or controller rack module 105. Insulative material 430 may be comprised of an insulator, such as black epoxy, heat shrinkable tubing, or any other material with insulative properties. Conductive material 440 may be comprised of a conductor, such as copper, aluminum, or any other conductive material commonly used to conduct electrical current. As would be understood by one of ordinary skill in the art, other suitable materials may be used for insulative material 430 and conductive material 440 of an insulated bus bar 120.

Connector ends 445 may be coupled to any positive terminal 112, negative terminal 113, or both of any one or more battery rack modules 110 or controller rack module 105 as shown in FIG. 1. Positive terminal 112 or negative terminal 113 of a battery rack module 110 or controller rack module 105 may further comprise a pluggable connector (not shown) to allow for easy and efficient electrical connection between the battery rack module 110 or controller rack module 105 and conductive material 440 of insulated bus bar 120. In some embodiments, when insulated bus bar 120 is coupled to one or more battery rack modules 110, controller rack module 105, or both, conductive material 440 may be substantially or completely enclosed, such that none of conductive material 440 is exposed or able to be contacted.

Thus, the present disclosure allows for an improved method for safely and efficiently connecting battery rack modules in a battery rack system. The methods and systems described herein allow for possible expansion of additional battery rack modules, as any number of insulated bus bars 120 and battery rack modules 110 may be used with or added to the battery rack system 100. Additionally, the present disclosure describes an all front-access battery rack system, which allows for easier setup and installation compared to alternative side or rear access systems, which may require additional components and safety features. The front-access design is also an improvement in safety as the system is entirely insulated when energized from an operator or other personnel operating the battery rack system.

What is claimed is:

1. A battery rack system comprising:
   a controller rack module aligned on a rack;
   a battery rack module aligned on the rack, wherein the controller rack module and the battery rack module each comprises an insulated guide bracket;
   first and second insulated bus bars aligned perpendicularly to and electrically coupling the controller rack module to the battery rack module along a front side of the rack, wherein the battery rack module and the controller rack module each comprise a positive terminal and a negative terminal, wherein the positive and negative terminals of the controller rack module and the battery rack module are configured to be vertically aligned for the lengths of both the first and second insulated bus bars to be disposed perpendicular to the width of the front side of the rack, wherein each insulated bus bar comprises:
      a conductive material comprising conductive connector ends operable to electrically engage with the controller rack module and the battery rack module, wherein the conductive connector ends are enclosed in the insulated guide brackets; and
      an insulative material electrically insulating the conductive material between the conductive connectors.

2. The battery rack system of claim 1 further comprising:
   a second battery rack module and third and fourth insulated bus bars, wherein the third insulated bus bar couples positive terminals of the first battery rack module and the second battery rack module, and wherein the fourth insulated bus bar couples negative terminals of the first battery rack module and the second battery rack module.

3. The battery rack system of claim 1, wherein the battery rack module comprises a first battery and a second battery, and wherein the first battery and the second battery are electrically coupled in series.

4. The battery rack system of claim 1, wherein the conductive connector ends of the insulated bus bar are not exposed when the conductive connector ends are coupled to the battery rack module, the controller rack module, or both.

5. The battery rack system of claim 1, wherein the insulative material of the insulated bus bar comprises black epoxy or heat shrinkable tubing.

6. The battery rack system of claim 1, wherein the insulated bus bar comprises a unitary rigid conductive material with exposed conductive connectors on two ends.

7. The battery rack system of claim 1, further comprising:
   an insulation cover substantially enclosing each of the first and second insulated bus bars along the length of the front side of the rack without substantially enclosing the front side of the rack, wherein the insulation cover is comprised of electrically insulative material.

8. A method of powering a battery rack system, comprising:
   aligning a controller rack module on a rack;
   aligning at least one battery rack module in parallel to the controller rack module on a rack, the at least one battery rack module and the controller rack module each comprising a positive terminal and a negative terminal facing a front side of the rack;
   aligning at least one insulated bus bar perpendicularly to the at least one battery rack module and controller rack module;
   electrically coupling a first insulated bus bar to the positive terminal of the at least one battery rack module and the controller rack module on the front side of the rack; and
   electrically coupling a second insulated bus bar to the negative terminal of the at least one battery rack module and the controller rack module on the front side of the rack, wherein the positive and negative terminals of the controller rack module and the at least one battery rack module are configured to be vertically aligned for the lengths of both the first and second insulated bus bars to be disposed perpendicular to the width of the front side of the rack, wherein each insulated bus bar comprises:
      a conductive material comprising conductive connector ends operable to electrically engage with the controller rack module and the at least one battery rack module, wherein the conductive connector ends are enclosed in the insulated guide brackets; and
      an insulative material electrically insulating the conductive material between the conductive connectors.

9. The method of claim 8, wherein the at least one insulated bus bar comprises a rigid conductive material substantially enclosed in an insulative material.

10. The method of claim 9, wherein none of the conductive material of an insulated bus bar is exposed when the insulated bus bar is coupled to the at least one battery rack module, the controller rack module, or both.

11. The method of claim 9, wherein the insulative material of the at least one insulated bus bar comprises black epoxy or heat shrinkable tubing.

12. The method of claim 9, wherein the conductive material of the at least one insulated bus bar comprises aluminum or copper.

13. The method of claim 8, wherein the at least one insulated bus bar is electrically coupled to the at least one battery rack module on the front face of said battery rack module.

14. The method of claim 8, wherein the plurality of battery rack modules comprises at least two battery rack modules, and wherein the plurality of insulated bus bars comprises at least four insulated bus bars.

15. The method of claim 8, further comprising:
   coupling an insulation cover to the battery rack system such that each of the at least one insulated bus bar is enclosed.

16. The method of claim 8, wherein the at least one battery rack module comprises a first battery and a second battery, and wherein the first battery and second battery are electrically coupled in series.

17. A front access battery rack system comprising:
   a controller rack module aligned horizontally on a rack;

a plurality of battery rack modules aligned horizontally and parallel to the controller rack module and to one another on the rack, each battery rack module comprising a positive terminal and a negative terminal, wherein the controller rack module and the plurality of battery rack modules each comprises an insulated guide bracket;

a plurality of insulated bus bars aligned vertically and perpendicularly to the plurality of battery rack modules, wherein the controller rack module comprises a positive terminal and a negative terminal, wherein the positive and negative terminals of the controller rack module and the plurality of battery rack modules are configured to be vertically aligned for the lengths of plurality of insulated bus bars to be disposed perpendicular to the width of a front side of the rack, wherein the plurality of insulated bus bars comprises a first set of insulated bus bars and a second set of insulated bus bars, such that:

the first set of insulated bus bars electrically couple the positive terminals of the plurality of battery rack modules and the controller rack module; and the second set of insulated bus bars electrically couple the negative terminals of the plurality of battery rack modules and the controller rack module.

18. The front access battery rack system of claim 17, further comprising:

an insulation cover substantially enclosing each of the plurality of insulated bus bars along the length of the front side of the rack without substantially enclosing the front side of the rack, wherein the insulation cover is comprised of electrically insulative material.

\* \* \* \* \*